(12) United States Patent
Ploss, Jr.

(10) Patent No.: US 8,906,245 B2
(45) Date of Patent: Dec. 9, 2014

(54) MATERIAL TRIVIAL TRANSFER GRAPHENE

(71) Applicant: Richard S. Ploss, Jr., Medford, MA (US)

(72) Inventor: Richard S. Ploss, Jr., Medford, MA (US)

(*) Notice: Subject to any disclaimer, the term of this patent is extended or adjusted under 35 U.S.C. 154(b) by 125 days.

(21) Appl. No.: 13/848,611

(22) Filed: Mar. 21, 2013

(65) Prior Publication Data

US 2013/0248097 A1    Sep. 26, 2013

Related U.S. Application Data

(60) Provisional application No. 61/613,899, filed on Mar. 21, 2012.

(51) Int. Cl.
| | |
|---|---|
| *B32B 38/10* | (2006.01) |
| *C01B 31/04* | (2006.01) |
| *B82Y 40/00* | (2011.01) |

(52) U.S. Cl.
CPC ............... *B32B 38/10* (2013.01); *B82Y 40/00* (2013.01); *C01B 31/0453* (2013.01); *C01B 31/0484* (2013.01); *C01B 31/0438* (2013.01); *Y10S 977/847* (2013.01); *B32B 2311/12* (2013.01); *B32B 2313/04* (2013.01); *B32B 2333/12* (2013.01)
USPC ............................................ 216/20; 977/847

(58) Field of Classification Search
USPC .................................. 427/113, 248.1, 249.4
See application file for complete search history.

(56) References Cited

U.S. PATENT DOCUMENTS

2012/0298619 A1* 11/2012 Jiang et al. ..................... 216/20

OTHER PUBLICATIONS

Lee. et al., Wafer-Scale Synthesis and Transfer of Graphene Films 2010, Nano Lett., 10, pp. 490-493.*
Kim et al. Large-scale pattern growth of graphene films for stretchable transparent electrodes, Feb. 2009, Nature Letters vol. 457, pp. 706-709.*

* cited by examiner

*Primary Examiner* — Duy Deo
*Assistant Examiner* — Erin Bergner

(57) ABSTRACT

A method for transferring PMMA-coated graphene can transfer graphene to a wide variety of different substrate surfaces. It transfers graphene to different surfaces by using of Poly (methyl methacrylate) (PMMA), polymer such as sponge, and deionized (DI) water. This method comprises easy steps of coating CVD graphene with a layer of PMMA; placing the PMMA-coated CVD graphene onto a polymer to form a PMMA-coated CVD graphene on the surface of a polymer; putting this polymer with PMMA-coated CVD graphene in DI water, and finally scooping up the PMMA-coated CVD graphene with one target substrate. In this way, it transfers the CVD graphene to a target substrate surface.

18 Claims, 5 Drawing Sheets

MATERIAL TRIVIAL TRANSFER GRAPHENE

The current application claims a priority to the U.S. Provisional Patent application Ser. No. 61/613899 filed on Mar. 21, 2012.

FIELD OF THE INVENTION

The present invention relates generally to a method for transferring graphene. More specifically, the present invention is a method for transferring a PMMA-coated graphene onto various target substrates.

BACKGROUND OF THE INVENTION

Graphene is a substance composed of pure carbon. Its atoms arranged in a regular hexagonal pattern similar to the normal graphite. However, graphene is structurally a one-atom thick sheet. It is very light, with a 1-square-meter sheet weighing only 0.77 milligrams. Graphene is an allotrope of carbon. Its structure is one-atom-thick planar sheets of $sp^2$-bonded carbon atoms that are densely packed in a honeycomb crystal lattice. The term graphene was coined as a combination of graphite and the suffix -ene by Hanns-Peter Boehm, who described single-layer carbon foils in 1962. Graphene is most easily visualized as an atomic-scale chicken wire made of carbon atoms and their bonds. The crystalline or "flake" form of graphite consists of many graphene sheets stacked together. In essence, graphene is an isolated atomic plane of graphite. The Nobel Prize in Physics for 2010 was awarded to Andre Geim and Konstantin Novoselov at the University of Manchester "for groundbreaking experiments regarding the two-dimensional material graphene".

The carbon-carbon bond length in graphene is about 0.142 nanometers. Graphene sheets stack to form graphite with an interplanar spacing of 0.335 nm, which means that a stack of three million sheets would be only one millimeter thick (approximately the thickness of a U.S. dime coin). Graphene is the basic structural element of some carbon allotropes including graphite, charcoal, carbon nanotubes and fullerenes. It can also be considered as an indefinitely large aromatic molecule, the limiting case of the family of flat polycyclic aromatic hydrocarbons.

People are so interested in graphene because of its groundbreaking two-dimensional structure and a number of unique properties. For instances, graphene appears to be one of the strongest materials ever found. Measurements have shown that graphene has a breaking strength over 100 times greater than a hypothetical steel film of the same thickness. It has displayed an anomalous quantum Hall effect with the sequence of steps shifted by 1/2 with respect to the standard sequence; and these remarkable anomalies can even be measured at room temperature, i.e. at roughly 20° C. Graphene also has remarkably high electron mobility at room temperature, which makes it a suitable material for the construction of future quantum computers using anyonic circuit.

Several potential applications for graphene are under development, and many more have been proposed. These include lightweight, thin, flexible, yet durable display screens, electric circuits, and solar cells, as well as various medical, chemical, and industrial processes enhanced or enabled by the use of new graphene materials. For instances, graphene has the ideal properties to be an excellent component of integrated circuits. It has a high carrier mobility, as well as low noise, allowing it to be used as the channel in a field-effect transistor. In addition, graphene's high electrical conductivity and high optical transparency make it a candidate for transparent conducting electrodes, required for such applications as touch screens, liquid crystal displays, organic photovoltaic cells, and organic light-emitting diodes.

Giving its outstanding electrical, mechanical and chemical properties, and great application potentials, the practical technologies about graphene synthesis and transfer is the key for its future applications in various areas. In recent years, the research papers about graphene have been mainly focusing on graphene synthesis, transfer and applications. Up to date, producing large-area graphene is still a challenge and bottleneck for researchers. The technology about how to conveniently transfer large-area graphene onto other substrates has not been established yet. In this way, it is believed that the present invention will greatly help researchers to be successful with their experiments related to the graphene transferring work.

DETAIL DESCRIPTIONS OF THE INVENTION

All illustrations of the drawings are for the purpose of describing selected versions of the present invention and are not intended to limit the scope of the present invention.

The primary purpose of the present invention is to provide a practical and efficient technology that can be used to transfer graphene to a wide variety of different substrate surfaces, which would be next used in many areas with taking advantages of graphene's outstanding mechanical and electronic properties. The present invention introduces a new method that can easily transfer graphene, which could be a poly (methyl methacrylate)-coated (PMMA-coated) single-layer or multi-layer graphene, from a source substrate to many different target substrate surfaces for various future studies and applications.

In comparison with other currently available technologies and methods for the similar purpose, the present invention has numerous practical advantages. It is a very easy approach; most operators can learn it very quickly. Additionally, the whole transfer process itself is very quick and easy. It only takes a few seconds to transfer the graphene to a target substrate. The entire transfer process is very convenient and with a very low cost. The main transfer medium used in the present invention is just water. Other substrates and agents needed in the transferring process are just the conventional polymer sponge and PMMA. On the other hand, the methodology disclosed in the present invention is very efficient and reliable. It can be used to transfer graphene to a wide variety of different substrate surfaces.

The present invention is a Trivial Transfer Graphene™ product that provides a new method for large-area graphene transfer and applications. The value of the present invention is in its ability to move the decision about an appropriate substrate (target substrate) to the researcher; i.e., the researcher has quite freedom to determine which substrate the graphene would be transferred to; and they can choose from a wide variety of different substrates. It initially transfers a PMMA-coated single-layer or multi-layer graphene to the surface of a polymer (sponge) without damaging the graphene. Briefly speaking, when a customer wants to transfer the graphene onto any other substrate, the procedure can be completed in several seconds. The researcher simply drops a product into deionized (DI) water, waits a second for the graphene to float free and scoops up the graphene onto any other flat substrate he or she may choose.

With the aforementioned introductions, it is easily understood that the present invention has a great market potential. It could be proven to be a very remarkable and beneficial milestone for the graphene research community. It allows the researchers to do various simple, quick yet very critical experimentations on many different types of substrates, without being limited to what graphene substrate a manufacturer is selling on the market.

Figure 1:
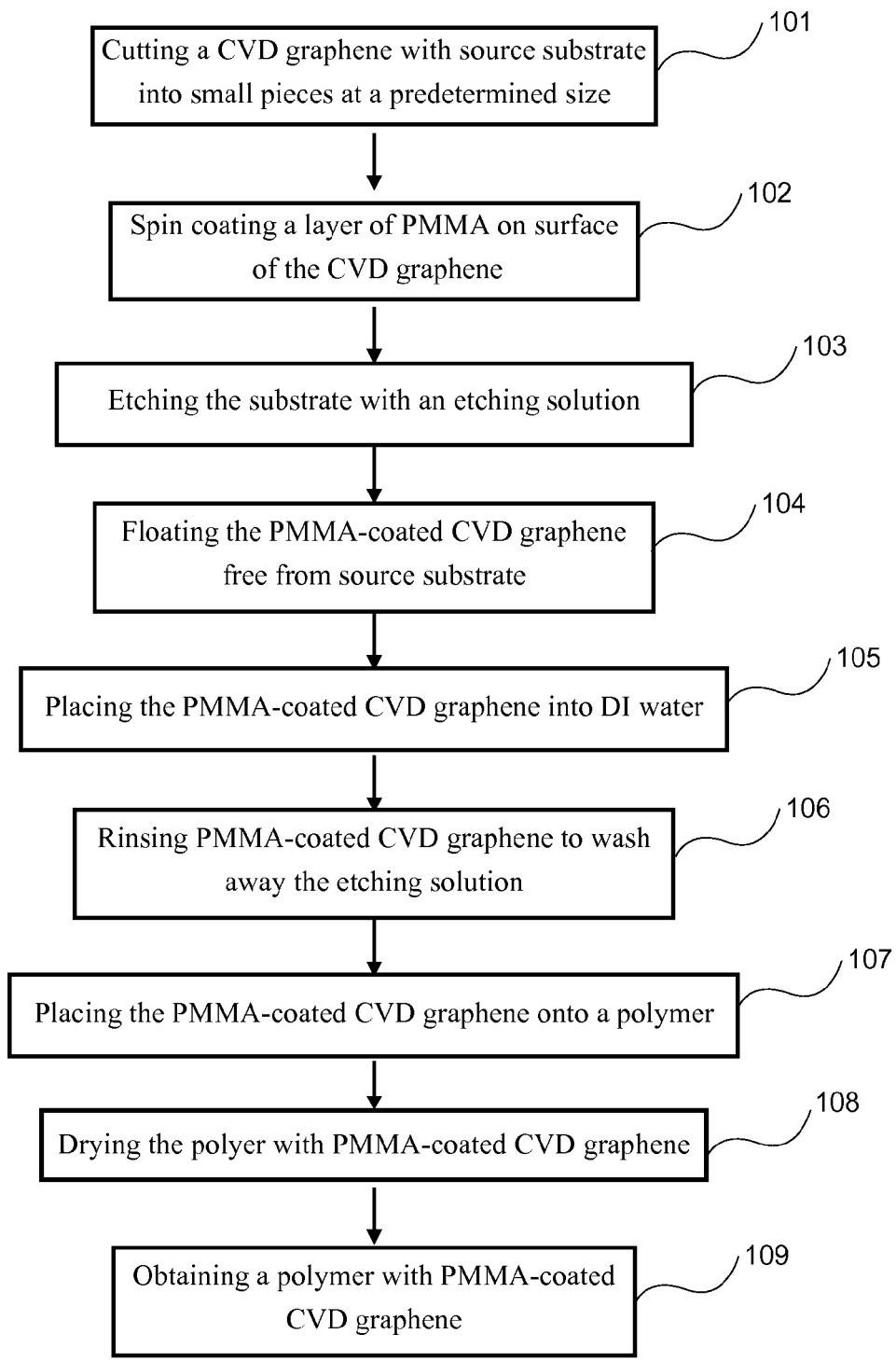
FIG. 1 is a flow chart showing the process for preparing a PMMA-coated graphene on a polymer.
Figure 2:
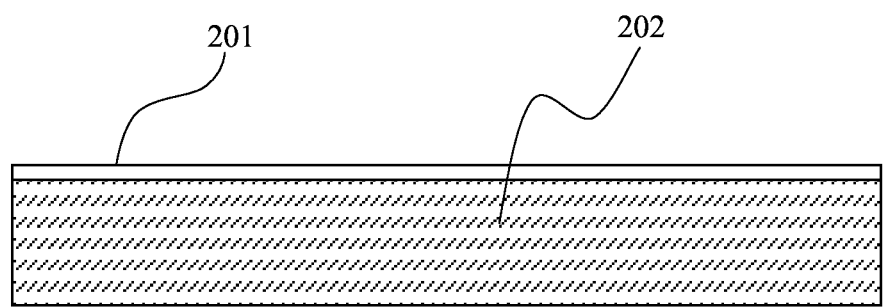
FIG. 2 is a cross sectional view of CVD graphene on a source substrate.
Figure 3:
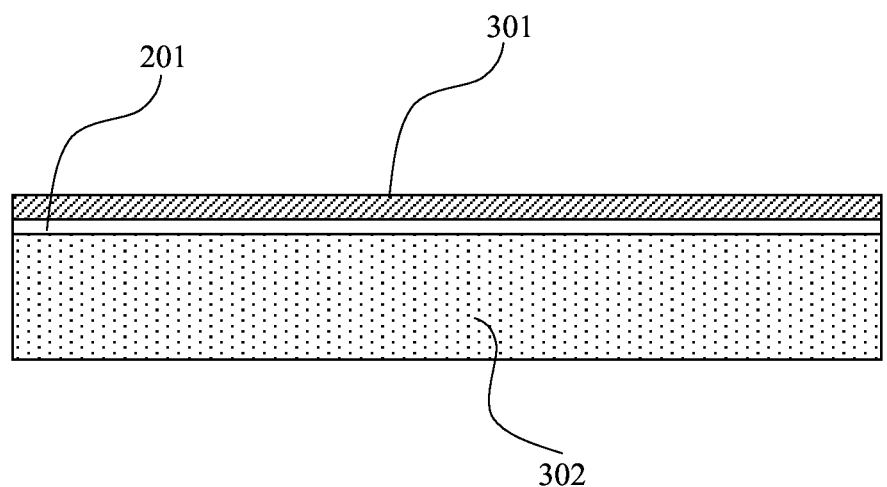
FIG. 3 is a cross sectional view of a PMMA-coated CVD graphene on a polymer.

In reference to FIG. 1, FIG. 2 and FIG. 3, the method and process for preparing the initial graphene transfer product comprises the following steps:

Step 1: Remove the Chemical Vapor Deposition (CVD) graphene 201 from the source substrate 202.

Cut the CVD graphene 201 on a source substrate 202 (such as a copper foil substrate) into small pieces at a pre-determined size 101, spin coat a layer of PMMA 301 on the surface of CVD graphene 102. This PMMA layer 301 is used for holding the CVD graphene layer 201 together. Use a proper etching solution to etch the copper foil away 103. Then the PMMA-coated CVD graphene floats free from the source substrate 104.

Step 2: Clean the PMMA-coated CVD graphene with DI water.

Place the PMMA-coated CVD graphene into DI water 105, and rinse it for several times, until the etching solution is washed away 106.

Step 3: Producing the Trivial Transfer Graphene™

Place the PMMA-coated CVD graphene onto a polymer 302 (such as a sponge) 107, then dry the polymer with PMMA-coated CVD graphene 108.

The CVD graphene 201 can be n-type or p-type, single-layer or multi-layer, or doped. The polymer 302 can be nano-scale sponge or common sponge, with even surface, any thickness and size. The concentration of PMMA 301 is 3%-20% mg/ml of mass concentration.

As referenced in FIG. 3, the initial transfer product in the present invention comprises the following components:

1) The polymer (sponge) 302;
2) The PMMA-coated 301 single-layer or multi-layer graphene 201.

Figure 4:
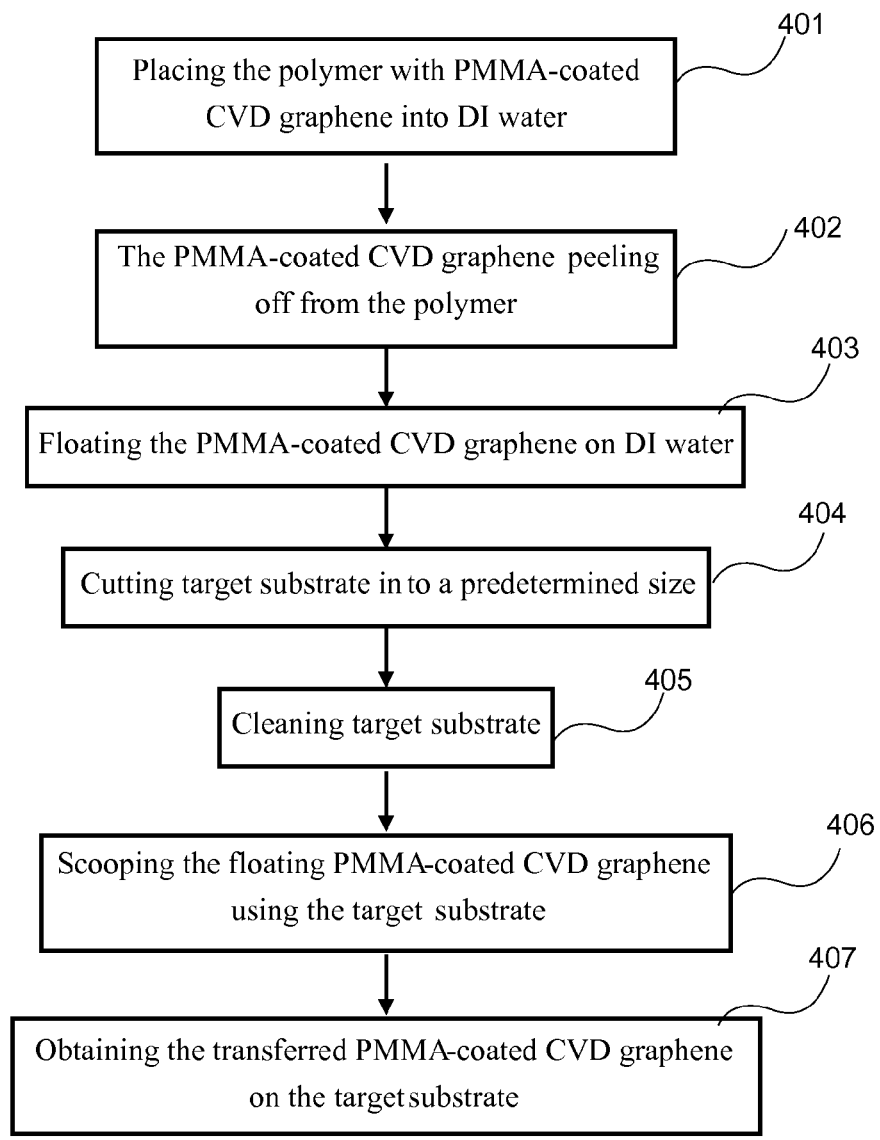
FIG. 4 is a flow chart showing the process for transferring the PMMA-coated graphene to a target substrate.
Figure 5:
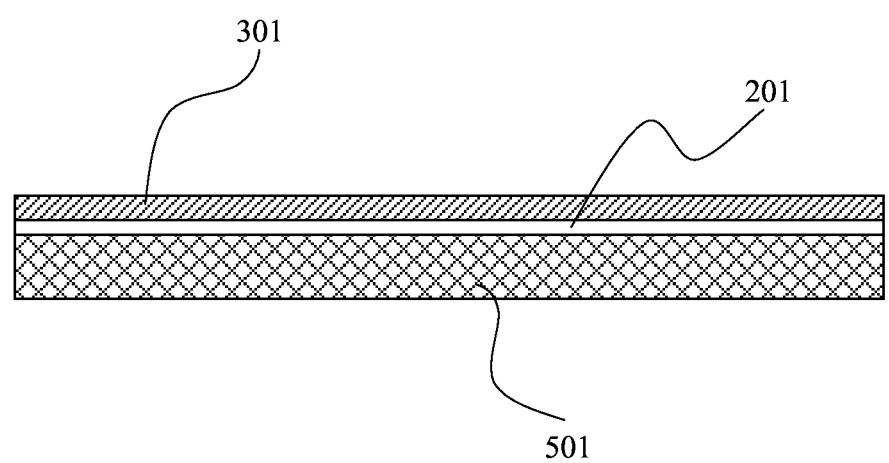
FIG. 5 is a cross-sectional view of a PMMA-coated CVD graphene on a target substrate.

In reference to FIGS. 4 and 5, the present invention and its usage for transferring graphene to many target substrate surfaces can be more easily understood with the following example that illustrates the preferred embodiment of the present invention:

1) Cut the CVD graphene (single layer, on copper foil substrate) into small pieces (1 cm by 1 cm), spin coat a layer of PMMA (with a concentration of 10% mg/ml) on the surface of CVD graphene. Put it into the etching solution ($CuSO_4$:HCl:$H_2O$=10 g:50 ml:50 ml) to etch the copper foil away. Put the PMMA-coated CVD graphene into DI water, wash for several times and then transfer it onto the surface of a nano-scale sponge. Dry the sponge with PMMA-coated CVD graphene on its surface. Now we get the Trivial Transfer Graphene™, which is PMMA-coated CVD graphene on a polymer surface. It later can be conveniently used for graphene transfer to a target substrate.

2) Put the Trivial Transfer Graphene™ into DI water 401, the PMMA-coated CVD graphene automatically peels off from the nano-scale sponge 402, and floats on DI water 403. Now the researcher can transfer it onto any desired target substrate 501 with an even surface.

3) For this example, we are using silicon dioxide as the target substrate 501. Prepare the substrate by cutting it to a desired pre-determined size 404 and carefully cleaning it 405. Now simply use the target substrate to scoop up the PMMA-coated CVD graphene 406. And finally obtain the transferred PMMA-coated CVD graphene on the target substrate 407. It is apparent that transfers using Trivial Transfer Graphene™ are simple enough to encourage a greater range of experimentation with various substrates.

While the example described above describes precise dimensions of the graphene and compositions of materials, in alternative embodiments, any desired dimensions or compositions may be used.

Although the invention has been explained in relation to its preferred embodiment, it is to be understood that many other possible modifications and variations can be made without departing from the spirit and scope of the invention as herein described.

What is claimed is:

1. A method for transferring a poly(methyl methacrylate)-coated (PMMA-coated) graphene from a source substrate to a target substrate, comprising cutting said source substrate, wherein said source substrate has been coated with CVD graphene, into pieces;

spin-coating a layer of PMMA on surfaces of said CVD graphene;

etching away said source substrate from said PMMA-coated CVD graphene with an etching solution;

floating said PMMA-coated CVD graphene free from said source substrate in said etching solution;

placing said PMMA-coated CVD graphene into deionized (DI) water;

rinsing said PMMA-coated CVD graphene to wash away said etching solution;

in response of the step of rinsing, coating said PMMA-coated CVD graphene onto a polymer;

drying said polymer, wherein said polymer has been coated with said PMMA-coated CVD graphene; and obtaining said polymer which has been coated with said PMMA-coated CVD graphene.

2. The method for transferring a PMMA-coated graphene from a source substrate to a target substrate of claim 1, comprising said source substrate is a copper foil substrate; and
said etching solution is $CuSO_4$:HCl:$H_2O$=10 g:50 ml:50 ml.

3. The method for transferring a PMMA-coated graphene from a source substrate to a target substrate of claim 1, comprising said polymer is a sponge.

4. The method for transferring a PMMA-coated graphene from a source substrate to a target substrate of claim 3, comprising said sponge is a nano-scale sponge.

5. The method for transferring a PMMA-coated graphene from a source substrate to a target substrate of claim 1, comprising said CVD graphene is a single-layer graphene.

6. The method for transferring a PMMA-coated graphene from a source substrate to a target substrate of claim 1, comprising
said CVD graphene is a multi-layer graphene.

7. The method for transferring a PMMA-coated graphene from a source substrate to a target substrate of claim 1, comprising
said CVD graphene is a doped graphene.

8. The method for transferring a PMMA-coated graphene from a source substrate to a target substrate of claim 1, comprising
said PMMA is at a concentration of 3%-20% mg/ml.

9. The method for transferring a PMMA-coated graphene from a source substrate to a target substrate of claim 1, comprising
placing said polymer, wherein said polymer has been coated with said PMMA-coated CVD graphene, into DI water;
peeling off said PMMA-coated CVD graphene from said polymer;
floating said PMMA-coated CVD graphene on said DI water;
cutting said target substrate at a pre-determined size;
cleaning said target substrate;
scooping up said floating PMMA-coated CVD graphene with said target substrate; and
obtaining said target substrate, wherein said target substrate has been coated with said PMMA-coated CVD graphene.

10. A method for transferring a PMMA-coated graphene from a source substrate to a target substrate, comprising
preparing a polymer, wherein said polymer has been coated with said PMMA-coated CVD graphene;
placing said polymer which has been coated with said PMMA-coated CVD graphene, into DI water;
peeling off said PMMA-coated CVD graphene from said polymer;
floating said PMMA-coated CVD graphene on said DI water;
cutting said target substrate at a pre-determined size;
cleaning said target substrate;
scooping up said floating PMMA-coated CVD graphene with said target substrate; and
obtaining said target substrate, wherein said target substrate has been coated with said PMMA-coated CVD graphene.

11. The method for transferring a PMMA-coated graphene from a source substrate to a target substrate of claim 10, comprising
cutting said source substrate, wherein said source substrate has been coated with CVD graphene, into pieces;
spin-coating a layer of PMMA on surfaces of said CVD graphene;
etching away said source substrate from said PMMA-coated CVD graphene with an etching solution;
floating said PMMA-coated CVD graphene free from said source substrate in said etching solution;
placing said PMMA-coated CVD graphene into DI water;
rinsing said PMMA-coated CVD graphene to wash away said etching solution;
after the step of rinsing, coating said PMMA-coated CVD graphene onto a polymer;
drying said polymer, wherein said polymer has been coated with said PMMA-coated CVD graphene; and
obtaining said polymer which has been coated with said PMMA-coated CVD graphene.

12. The method for transferring a PMMA-coated graphene from a source substrate to a target substrate of claim 11, comprising
said source substrate is a copper foil substrate; and
said etching solution is $CuSO_4$:HCl:$H_2O$=10 g:50 ml:50 ml.

13. The method for transferring a PMMA-coated graphene from a source substrate to a target substrate of claim 11, comprising
said polymer is a sponge.

14. The method for transferring a PMMA-coated graphene from a source substrate to a target substrate of claim 13, comprising
said sponge is a nano-scale sponge.

15. The method for transferring a PMMA-coated graphene from a source substrate to a target substrate of claim 11, comprising
said CVD graphene is a single-layer graphene.

16. The method for transferring a PMMA-coated graphene from a source substrate to a target substrate of claim 11, comprising
said CVD graphene is a multi-layer graphene.

17. The method for transferring a PMMA-coated graphene from a source substrate to a target substrate of claim 11, comprising
said CVD graphene is a doped graphene.

18. The method for transferring a PMMA-coated graphene from a source substrate to a target substrate of claim 11, comprising
said PMMA is at a concentration of 3%-20% mg/ml.

* * * * *